(12) United States Patent
Swan (10) Patent No.: US 10,365,668 B2
(45) Date of Patent: Jul. 30, 2019

(54) VAPOR CONTROL FOR STORAGE TANK WITH PUMP OFF UNIT

(71) Applicant: Randy Swan, Granbury, TX (US)

(72) Inventor: Randy Swan, Granbury, TX (US)

(*) Notice: Subject to any disclaimer, the term of this patent is extended or adjusted under 35 U.S.C. 154(b) by 144 days.

(21) Appl. No.: 15/689,387

(22) Filed: Aug. 29, 2017

(65) Prior Publication Data

US 2018/0059692 A1 Mar. 1, 2018

Related U.S. Application Data

(60) Provisional application No. 62/395,165, filed on Sep. 15, 2016, provisional application No. 62/381,248, filed on Aug. 30, 2016.

(51) Int. Cl.
| | | |
|---|---|---|
| *G05D 7/06* | (2006.01) | |
| *E21B 41/00* | (2006.01) | |
| *B65D 90/34* | (2006.01) | |
| *B65D 90/48* | (2006.01) | |
| *B65D 88/54* | (2006.01) | |
| *B65D 88/02* | (2006.01) | |
| *E21B 43/34* | (2006.01) | |

(52) U.S. Cl.
CPC ............ *G05D 7/0676* (2013.01); *B65D 88/02* (2013.01); *B65D 88/54* (2013.01); *B65D 90/34* (2013.01); *B65D 90/48* (2013.01); *E21B 41/00* (2013.01); *G05D 7/0611* (2013.01); *G05D 7/0617* (2013.01); *G05D 7/0688* (2013.01); *E21B 43/34* (2013.01); *Y10T 137/0324* (2015.04); *Y10T 137/0379* (2015.04); *Y10T 137/2534* (2015.04); *Y10T 137/7287* (2015.04); *Y10T 137/7306* (2015.04)

(58) Field of Classification Search
CPC ...... G05D 7/06; G05D 7/0611; G05D 7/0617; G05D 7/0623; G05D 7/0676; G05D 7/0688; G05D 9/12; G05D 17/02; B65D 90/34; B65D 90/48; B65D 88/54; B65D 88/02; E21B 41/00; E21B 43/34; Y10T 137/7306; Y10T 137/0324; Y10T 137/0368; Y10T 137/0379; Y10T 137/7287; Y10T 137/2534; Y10T 137/2541

See application file for complete search history.

(56) References Cited

U.S. PATENT DOCUMENTS

| | | | |
|---|---|---|---|
| 2,940,593 A | 6/1960 | Remke et al. | |
| 3,295,371 A | 1/1967 | Smith | |
| 3,351,084 A * | 11/1967 | Halkiades | G01F 23/70 |
| | | | 137/392 |

(Continued)

*Primary Examiner* — Ian G Paquette
(74) *Attorney, Agent, or Firm* — Geoffrey A. Mantooth; Brian K. Yost (57) ABSTRACT

A system and method removes well fluids, which include gas and liquids, from a storage tank. The storage tank has a gas relief valve that opens to admit atmospheric air into the storage tank when the pressure of a gas cap decreases below a vacuum threshold pressure. Well fluids flow into the storage tank and the level of liquid is monitored. When the level reaches a first level, a pump is operated by a controller to remove liquid from the storage tank. The pressure in the gas cap is monitored while the pump is operating. The speed of the pump is adjusted to maintain the gas cap pressure above the predetermined pressure and avoid the introduction of atmospheric air into the gas cap.

20 Claims, 4 Drawing Sheets

(56) References Cited

U.S. PATENT DOCUMENTS

| | | | |
|---|---|---|---|
| 4,507,053 A | 3/1985 | Frizzell | |
| 5,398,629 A | 3/1995 | Wasenius | |
| 5,601,413 A | 2/1997 | Langely et al. | |
| 5,819,848 A | 10/1998 | Rasmuson et al. | |
| 9,895,630 B2 * | 2/2018 | Adler | B01D 19/0063 |
| 2012/0285896 A1 | 11/2012 | Black | |
| 2013/0032217 A1 * | 2/2013 | Pesek | G01F 25/0007 137/2 |
| 2014/0318629 A1 | 10/2014 | Gieske | |
| 2015/0090342 A1 * | 4/2015 | Cartwright | G05D 9/12 137/2 |

* cited by examiner

VAPOR CONTROL FOR STORAGE TANK WITH PUMP OFF UNIT

FIELD OF THE INVENTION

The present invention relates to storage tanks that store gas and liquids such as oil, water and condensates produced from wells, and in particular to storage tanks equipped with pump removal units, such as LACT units.

BACKGROUND OF THE INVENTION

Crude oil, condensate and water produced from wells are typically stored in storage tanks located at or near the well sites. The storage tanks provide temporary storage, as the wells may produce at a slow or uneven rate. Periodically, when a sufficient quantity of liquids have been produced and stored in the storage tank, the liquids are discharged from the tank.

One such method of discharging occurs when a tanker truck visits the well or production site. The truck driver manually connects the storage tank to the truck tanker and discharges the tank contents into the tanker. Another method involves automatically discharging, via a pump, the storage tank into a pipeline such as a sales line, which in turn is connected to a larger pipeline or tanker truck.

For example, one common method is to use, a LACT (Lease Automatic Custody Transfer) unit to automatically discharge and sell the liquids. Most LACT units meter the liquids that are sold so that an accurate measurement is obtained. The TACT unit also operates one or more pumps to move the liquids from the tank to the sales line or tanker truck. The LACT unit operates automatically, with no human intervention needed.

The liquid often contains gas in liquid or vapor form. Gas flashes off of the liquid and rises to the top of the tank. This gas is considered a valuable product and is removed from the tank by separate gas processing equipment for sale.

As liquid is removed from the tank, the pressure of the gas above the liquid decreases due to the increase in gas volume. If the pressure of the gas falls too much, a relief valve on the tank opens to admit atmospheric air into the tank. This is done to prevent the walls and exterior shell of the storage tank from collapsing due to a pressure differential between the outside and inside. The storage tank walls, ceiling and floor are thin and cannot withstand a significant pressure differential.

While admitting air saves the tank from collapse, it has detrimental effects on the downstream gas processing equipment, which includes pipelines, compressors, separation and processing equipment. Air of course contains oxygen and this oxygen causes corrosion and other safety concerns in the downstream equipment.

The same problem arises with water storage tanks. Many wells produce water (typically saltwater), in addition to oil and condensates. Much of the water is separated from the oil at the well site. The water is then stored in a tank that is separate from the oil storage tank. As with the oil, gas flashes off the water and is collected for processing and disposal. A pump removes the water from the storage tank and delivers the water to a pipeline truce, for eventual disposal down a disposal well. The pump can remove the water from the tank too fast, resulting in an inflow of atmospheric air into the tank. This air enters the downstream gas processing equipment.

Thus, it is desired to minimize the admission of air into downstream equipment and in particular into the gas stream or gas circuit of the transfer system.

SUMMARY OF THE INVENTION

A well fluid storage system comprises a storage tank capable of holding well fluids. The storage tank has a gas cap located above a liquid, a fluid inlet, a liquid outlet and a gas outlet. The storage tank has a gas pressure relief valve that opens when gas pressure inside the storage tank decreases below a vacuum threshold pressure. A pump is connected to the liquid outlet. A controller system comprises a drive coupled to and operating the pump at a variable speed, a gas pressure sensor in communication with the gas cap in the storage tank and a controller connected to the gas pressure sensor and the drive. The controller operates the drive to slow the pump speed as the pressure in the gap cap decreases toward the vacuum threshold pressure so as to maintain the gas pressure relief valve in a closed condition.

In one aspect, the well fluid storage system further comprises at least one liquid level sensor in communication with an interior of the storage tank, and connected to the controller, the controller starting and stopping the pump according to liquid levels in the storage tank.

In another aspect, the liquid levels comprise a high liquid level, wherein the controller starts the pump, and a low liquid level, wherein the controller stops the pump.

In another aspect, the liquid levels further comprise an emergency high liquid level, wherein the controller operates the pump independently of the gas cap pressure.

In another aspect, the storage tank comprises an oil storage tank. The well fluid storage system further comprises a lease automatic custody transfer unit, the pump being part of the lease automatic custody transfer unit.

In another aspect, the lease automatic custody transfer unit comprises a meter coupled to an output of the pump. The system further comprises a flow meter that monitors the flow of oil into the meter, the controller stopping the pump if the flow of oil into the meter is less than a predetermined minimum flow.

In another aspect, the storage tank comprises a water storage tank.

In another aspect, the gas outlet of the storage tank is coupled to a valve and to gas processing equipment, the controller operating the valve to allow gas to flow from the storage tank to the gas processing equipment.

In another aspect, the gas outlet of the storage tank is coupled to a valve and to a combustor, the controller operating the valve to allow gas to flow from the storage tank to the combustor.

In another aspect, the liquid levels comprise an emergency high liquid level, wherein the controller operates the pump independently of the gas cap pressure when the liquid level is at the emergency high liquid level, the controller operating the valve to allow gas to flow from the storage tank to the gas combustor after the pump operates to reduce the emergency high liquid level.

A method of removing well fluids from a storage tank is provided. The well fluids comprise gas and liquid, the gas located in a gas cap in the storage tank, the storage tank having a gas relief valve that opens to admit atmospheric air into the storage tank when the pressure of the gas cap decreases below a vacuum threshold pressure. The method allows well fluids to flow into the storage tank. A level of liquid in the storage tank is monitored. When the liquid level reaches a first level, a pump is operated at a speed to remove liquid from the storage tank. The pressure of the gas cap is monitored while the pump is operating. The speed of the pump is adjusted to maintain the gas cap pressure above the predetermined pressure and avoid the introduction of atmospheric air into the gas cap.

In one aspect, the step of adjusting the speed of the pump further comprises the step of decreasing the speed of the pump if the gas cap pressure decreases below a predetermined pressure range.

In another aspect, the step of adjusting the speed of the pump further comprises the step of decreasing the speed of the pump if the gas cap pressure decreases at or above a predetermined rate of pressure change.

In another aspect, the step of adjusting the speed of the pump further comprises the step of decreasing the speed of the pump if the gas cap pressure decreases for a predetermined period of time.

In another aspect, the method stops the pump when the liquid level reaches a second level which is below the first level.

In another aspect, the method operates the pump independently of the gas cap pressure when the liquid level reaches an emergency high liquid level.

In another aspect, the method delivers gas from the storage tank to a pipeline by opening a valve and allowing gas to flow from the storage tank to gas processing equipment.

In another aspect, the method delivers gas from the storage tank to a combustor by opening a valve and allowing gas to flow from the storage tank to the combustor.

In another aspect, the step of operating a pump at a speed to remove liquid from the storage tank, further comprises the step of removing oil from the storage tank.

In another aspect, the step of operating a pump at a speed to remove liquid from the storage tank, further comprises the step of removing water from the storage tank.

DESCRIPTION OF THE PREFERRED EMBODIMENT

Figure 1:
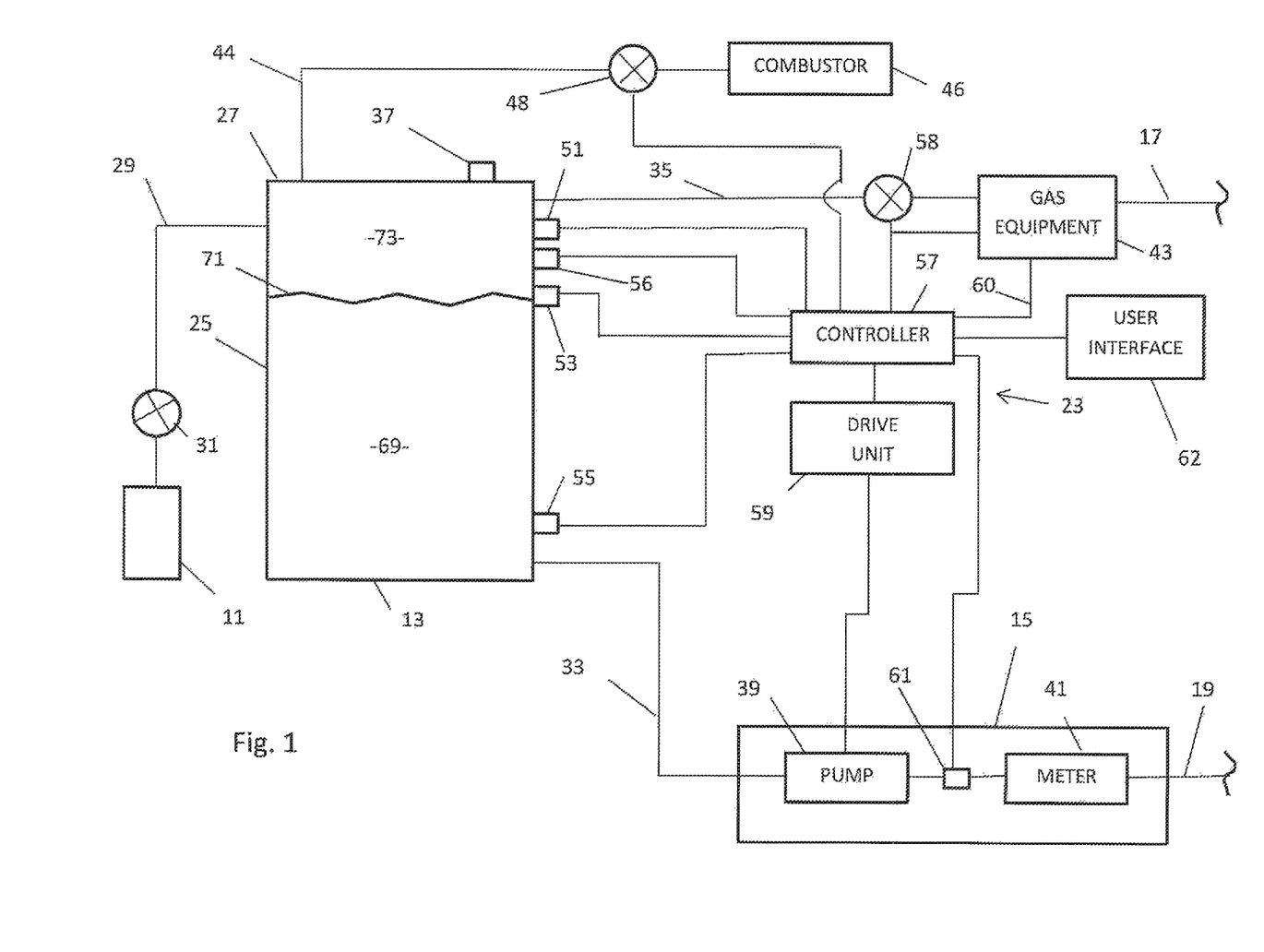
FIG. 1 is a diagram showing various surface components of a producing oil well, including a storage tank and a TACT unit.

In FIG. 1, there is shown a producing oil well 11 with various surface equipment. Liquid flows out of the well into a storage tank 13. Upstream surface producing equipment such as separators, may process the liquid before it enters the tank 13. Liquids are removed from the storage tank by way of a LACT unit 15. The LACT unit is connected to a sales line 19, which in turn is connected to one or more pipelines.

A control system 23 is provided to operate the LACT unit 15. The LACT unit is operated so that as liquid is being pumped or removed from the tank, the interior gas cap pressure of the tank 13 remains at a satisfactory level so that atmospheric air is not admitted into the tank. In this manner, oxygen is prevented from entering the gas processing equipment 43 located downstream of the tank 13.

The surface equipment will be discussed first, followed by a discussion of the control system 23. In the discussion, references to "upstream" and "downstream" may be used. These terms relate to the tank 13 and the flow of liquids thereto and therefrom. Like reference numbers on different embodiments indicate like components.

The surface equipment includes the storage tank 13 and the LACT unit 15. Other surface equipment may be included, such as one or more separators to separate water or gas from the oil.

The storage tank 13 has a side wall 25 and a top cap ceiling 27. A line from the well 11, or upstream surface production equipment, communicates with the interior of the tank 13. The line has one or more valves 31. The tank has an oil line 33 for removing oil and other liquids from the tank; the inlet of this line is typically located near the bottom of the tank. The oil line 33 connects to the LACT unit 15. A gas line 35 extends from the near the top of the tank and is used for removing gas from the tank.

The tank 13 has a relief valve or gauge hatch 37. Such relief valves and gauge hatches protect the tank from excessive vacuum conditions and excessive pressure conditions and consequently contain two valves. An example of a gauge hatch has two nested coil springs. One spring biases a vacuum valve in the closed position. When the pressure inside the tank drops below a vacuum threshold or setpoint, the vacuum valve opens to admit atmospheric air into the tank. The vacuum threshold is relative to atmospheric air pressure and may be several psi (pounds per square inch) less than atmospheric air pressure. The other spring, which may be outside of the first spring, biases a pressure valve in the closed position. When, the pressure inside the tank rises to an overpressure threshold or setpoint, the pressure valve opens to bleed gas to the outside atmosphere. Gauge hatches and relief valves for storage tanks are conventional and commercially available.

The LACT unit 15 has a pump 39 connected in line with the oil line 33 from the tank. The output of the pump extends to a meter 41, which measures the oil and other fluids passing through. The meter 41 is connected to the oil sales line 19. Various valves, control and sampling equipment (not shown) are provided. The LACT unit may have additional capabilities such as monitoring the quality of the oil and providing a sample of oil for retrieval by an operator LACT units 15 are typically skid mounted and are located in proximity to the tank 13.

The oil sales line 19 can be connected to a pipeline or made accessible to a tanker truck.

While liquids pass through the LACT unit 15, gas from the tank is removed via gas outlet line 35 to gas processing and handling equipment 43. Such equipment may include a VRU (vapor recovery unit), compressors, separators and pipe. The equipment 43 is shown connected to a gas sales line 17. The gas sales line is in turn connected to one or more pipelines. The desire to protect downstream equipment from oxygen intrusion extends to all of this downstream equipment, including pipes and pipelines.

The tank 13 may optionally be provided with vent line 44 that directs gas from the tank to a combustor 46. A valve 48 in the line 44 is provided.

The control system 23 is used to operate the TACT unit 15. The control system has sensors, a controller and a drive unit.

The sensors include a pressure sensor 51 located in the upper part of the tank so as to measure gas cap pressure inside the tank. There is also a high level sensor 53 and a low level sensor 55 inside the tank. The high level sensor 53 is located at a vertical location in the tank so that when liquid reaches this upper level or the upper level setpoint, the oil is removed from the tank. The high level sensor 53 is located below the gas pressure sensor 51. The low level sensor 55 is located at a vertical location inside the tank, and below the high level sensor 53, so that when liquid reaches this lower level or the lower level setpoint, the removal process is stopped. In addition, an emergency high level sensor 56 is provided at a level above the high level sensor 53. The sensors 51, 53, 55, 56 are connected to the controller 57.

The high, low and emergency high level sensors may be of a mechanical float type positioned at a fixed point in the tank, or may be based on another form of input such as hydrostatic pressure to monitor tank levels and may be adjustable by the operator to maintain various desired tank levels and setpoints.

The controller 57 has a processor and is commercially available; the controller may be a PLC (Programmable Logic Controller). The controller typically includes memory for storing and recording data, and a clock. The controller 57 obtains electrical power from the power source that operates the pump and other equipment on location. The inputs to the processor include the inputs from the sensors 51, 53, 55, 56. Other inputs may be included such as the clock, a shutoff switch, O2 (oxygen) sensors etc. The controller 57 has an output that connects to the drive unit 59. The drive unit 59 operates the LACT unit pump 39 at variable speeds. In the preferred embodiment, the drive unit 59 is a variable speed drive. Most commercially available drives have a built-in PLC or controller to provide logic and control of the driven components. The operator may elect to use this built-in capability and combine the controller with the drive unit into one component in lieu of using a separate controller and drive unit.

There is also a flow sensor 61 monitoring the flow into the oil meter 41. In some cases, this input may be sourced from the meter 41. Some meters and pumps require a minimum flow or pressure of fluid to accurately measure and produce the required flow. The flow sensor is connected as an input to the controller 57.

In addition, the controller 57 may be connected to the gas processing equipment 43. For example, the controller can be connected to operate a valve 58 that controls the flow of gas into the gas processing equipment. If the gas processing equipment has active equipment, such as a compressor, the controller can also be connected thereto by a line 60 to turn the active equipment off.

The controller may also be connected to the valve 48 to the combustor 46.

The connections of the controller to the gas processing equipment and to the vent valve are optional.

The controller 57 may be connected to a user interface 62. The user interface can be at the well site, or located remotely from the well site. Alternatively, there could be several user interfaces, with one located at the wellsite and others located remotely. The connection can be wired or wireless. The user interface 62 includes a display, a speaker and input buttons or keys.

In operation, fluids, including, oil and gas, flow from the well 11 or upstream production equipment into the tank 13. The sensors 51, 53, 55, 56 monitor the gas cap pressure and liquid level. As liquid 69 flows in, the liquid level 71 rises inside the tank 13. The liquid 69 includes oil, and can also include other liquids such as condensate. The volume above the liquid is referred to as the gas cap 73. Gas is commonly dissolved in the liquid in liquid or vapor form. As the liquid enters the tank it is subject to less pressure than when downhole or in pressurized upstream production equipment. The depressurization causes some of the constituents to flash. Gas flashes off of the liquid and rises to the top, or cap 73, of the tank. As this occurs, the pressure of the gas cap increases and subsequent control equipment such as VRU (vapor recovery unit) compressors are used to evacuate the excess gas from the tank into systems downstream.

The controller 57 monitors the high level sensor 53. When the controller determines that the liquid 69 has reached the level of the high level sensor 53, this represents the liquid reaching a predetermined upper level threshold. The controller 57 then operates the drive unit 59, which in, turn operates the pump 39 at a predetermined first speed. The pump 39 pumps off liquid from the tank via the oil line 33. The liquid passes through the meter 41 and into the sales line or tanker truck 19.

The controller 57 monitors the pressure of the gas cap inside the tank, via the sensor 51, and in particular while the pump 39 is operating. If the gas pressure remains constant, or within a pre-determined range, the controller continues to operate the drive unit 59 and the pump at the first speed. However, if the pressure drops below a predetermined threshold, the controller 57 slows the drive unit to operate the pump at a slower speed. This reduces the rate of flow of liquid out of the tank. This also serves to stop or slow the decrease in gas cap pressure inside the tank, thereby preventing the gauge hatch 37 from opening to admit atmospheric air into the tank. The controller continues to slow the drive unit if the gas cap pressure continues to fall. If the gas cap pressure remains constant, or within a pre-determined range, then the controller does not change the speed of the drive unit. If the gas pressure rises, then the controller increases the speed of the drive unit.

Figure 2:
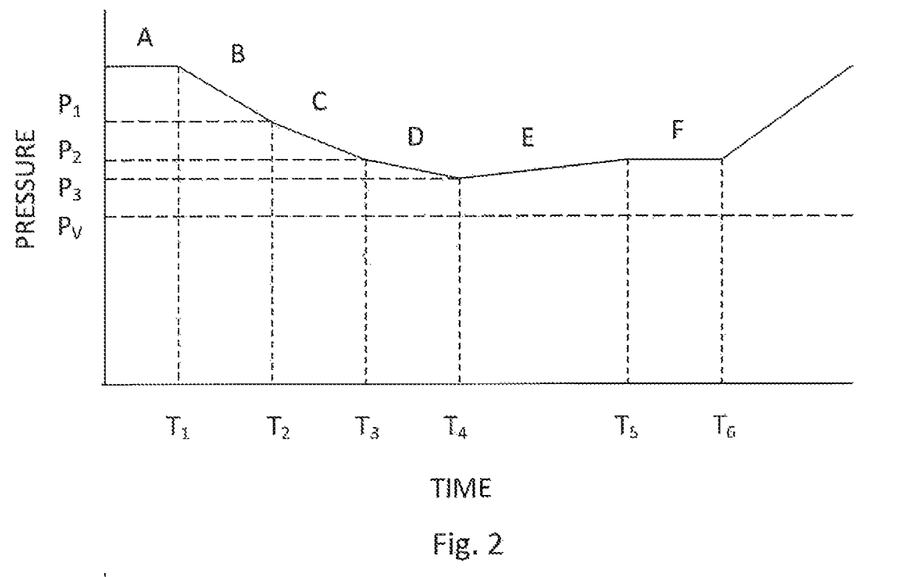
FIG. 2 is a graph illustrating an example of gas cap pressure over time.
Figure 3:
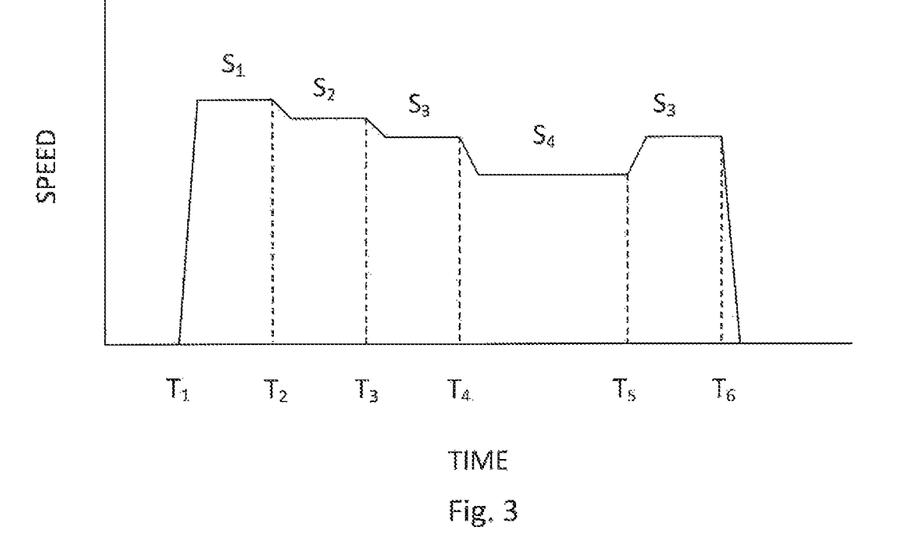
FIG. 3 is a graph illustrating the corresponding pump speed as a result of the gas cap pressure of FIG. 2, to illustrate the operation of controller system.

FIG. 2 illustrates an example of gas cap pressure over time while the LACT unit 15 is pumping off liquid. FIG. 3 illustrates pump speed over the same time frame. The times are the same in FIGS. 2 and 3. For example, T1 in FIG. 2 is the same time as T1 in FIG. 3. As FIG. 2 shows, pressure Pv is the vacuum or low pressure threshold at which the gauge hatch 37 relief valve opens to admit atmospheric air into the tank. The control system 23 maintains the gas cap pressure of the tank above this pressure Pv.

Initially, in time duration A, the fluid level in the tank is too low to begin pumping, so the pump is off. The cap pressure may be constant or it may fluctuate somewhat as fluid enters the tank. The cap pressure is a function of rate of flow of liquid into the tank and vapor pressure of the gas. At time T1, the fluid level has reached the upper sensor 53 and the controller 57 operates the drive unit which in turn operates the pump 39 at a first speed S1. The pump removes liquid from the storage tank, and expands the volume of the gas cap. This continues for time duration B. The controller continues to monitor gas cap pressure while the pump is operating and makes adjustments to pump speed as needed. In the example, the pressure of the gas cap falls at a rapid rate, so at time T2, the controller slows the pump speed to a second speed S2. This continues for time duration C. The pressure of the gas cap continues to fall, although at a slower rate. The gas cap pressure approaches Pv, so at time T3, the controller slows the pump again to a third speed S3. This continues for time duration D. The pressure of the gas cap continues to fall, although at an even slower rate, so at time T4, the controller slows the pump again to a fourth speed S4.

This continues for time duration E. The rate of liquid removal from the tank having been slowed, the gas cap pressure now increases. At time T5, the controller speeds the pump to the third speed S3. This continues for time duration F.

When the liquid level inside the tank reaches the low level sensor 55, the controller stops the drive unit and pump altogether, time T6. Pump speed falls to zero and gas cap pressure increases as more fluid enters the tank 25.

The controller can change the speed of the drive unit in incremental steps as shown. The incremental steps can be the same or different. In the example, the incremental step of speed change is the same from the first speed S1 to the second speed S2 as it is from the second speed to the third speed. However, the incremental steps can vary. The incremental step speed change from the third speed S3 to the fourth speed S4 is larger than the prior changes in speed. If need be, the controller can slow the pump speed to zero, stopping the pump; the controller resumes the pump operating when the gas cap pressure rises.

The speed discussed herein is the speed of the drive unit or the speed of the pump or both. The correlation of speed to pressure is almost limitless from the control standpoint and can be adjusted to minute increments with normal, commercially available controllers or PLC's.

Also, the controller can vary the time intervals in making speed adjustments. For example, time interval T1-T2 may be 20 seconds, time interval T2-T3 also 20 seconds. Time interval T3-T4 may be 20 seconds or something different, such as 30 seconds. Time interval T4-T5 is longer. The controller can have intermediate pressure thresholds to change the pump speed that are time independent. For example, if the gas cap pressure drops to a first predetermined value P1 (at time T2 in the example), then the controller makes a speed adjustment. If the gas cap pressure drops to a second predetermined value P2 (at time T3), then the controller makes another speed adjustment. If the gas cap pressure, drops to a third predetermined value P3 (at time T4), then the controller makes another speed adjustment. If the gas cap pressure rises to a predetermined value P2 (at time T5), then the controller makes another speed adjustment. The speed is adjusted faster or slower depending on the pressure change. If the pressure is rising, then the speed can be increased. If the pressure is decreasing, then the speed can be decreased.

While the pump is operating, the control system 23 successfully maintains the gas cap pressure above the vacuum threshold pressure Pv which opens the gauge hatch 37. Thus, atmospheric air does not enter the tank.

The control system also monitors the flow into the oil meter 41 by way of flow sensor 61. The oil meter may require a minimum flow in order to accurately measure the volume of liquid. If the flow into the meter 41 drops below this minimum flow, or if the gas cap pressure falls below the critical set-point, the control system stops the pump and allows the liquid level to increase inside the tank and the gas pressure to also increase.

The gas processing equipment 43 may operate either independently or in conjunction with the LACT system 15 depending on the well operator's desire. For example, if the gas processing equipment 43 has a VRU, vapor recovery unit, the controller 57 may be programmed to cause the VRU to shut down during LACT unit operation to prevent excessive gas evacuation, which may cause the pump-down cycle to be interrupted due to low gas cap pressure. This accomplished, for example, by the controller closing the valve 58 in the gas line 35 leading into the equipment, and shutting down any active equipment such as compressors by way of line 60. When the LACT unit no longer operates, with the pump 39 stopped, the controller 57 opens the valve 58 and restarts the gas processing equipment 43. Instead of shutting off the gas processing equipment, the controller 57 has the capability of partially closing the valve 58 or slowing the speed of the compressor by way of line 60, to slow the removal of gas from the tank.

The control system 23 has the ability to identify fault conditions where operation deviates from normal. For example, if liquid fills the tank 13 to a very high level, the risk of venting or losing liquid from the tank into the surrounding environment is a possibility. Such a situation may arise, for example, if a surge of liquid enters the tank. In order to minimize this risk, the control system prevents the spillage of liquid from occurring. If the emergency high level sensor 56 detects liquid at a predetermined emergency level, which is above the level sensed by the high level sensor 53, the controller 57 causes the pump 39 to operate at full speed or capacity, regardless of, or independently of, the gas cap pressure in the tank. Thus, the pump operates even if the gas cap pressure approaches or decreases below the threshold pressure $P_v$. When the liquid level in the tank falls to a predetermined level, the controller resumes normal operation of the LACT unit and the pump 39, varying the speed as needed.

While the pump is operating in an emergency mode, the controller continues to monitor gas cap pressure. If the pressure falls below Pv, then the controller closes valve 58 to prevent oxygen from entering the gas processing equipment 43. The controller records the time and duration of the low pressure event, for as long as the pressure remains below Pv. An indication is provided to the operator to alert the operator to an event where air was admitted into the tank. The operator can access this information via the user interface 42. The control of valve 58 and the recording of a low pressure event are optional.

After the occurrence of an emergency mode, an operator may wish to have any oxygen removed from the system. In such a case, the controller 57 is programmed to purge the gas from the tank. If the pressure has fallen below Pv, then the controller takes steps to purge the gas. After the liquid surge in the tank has been dealt with by operating the pump at full speed, the controller allows the gas cap pressure to increase to a predetermined level. Once the pressure reaches that level, the controller opens the valve 48, so that gas exits the tank through vent line 44. The gas combusts in the combustor 46. If need be, the controller actuates an ignitor in the combustor to initiate combustion.

While venting gas, the controller limits the venting to the gas volume in the tank. The controller determines the gas volume. As liquid is removed from the tank, the cap pressure drops, allowing gas to flash off the liquid. During the emergency mode, the volume of liquid pumped from the tank is measured by the meter 41. The flash rate per barrel of liquid is known and provided to the controller before operation. Thus, the volume of gas in the tank can be determined by the controller based on the volume of liquid pumped out. The controller opens the vent valve 48 for a sufficient duration so that the gas in the tank is vented. This purges any oxygen from the tank and prevents oxygen from entering the gas processing equipment.

Figure 4:
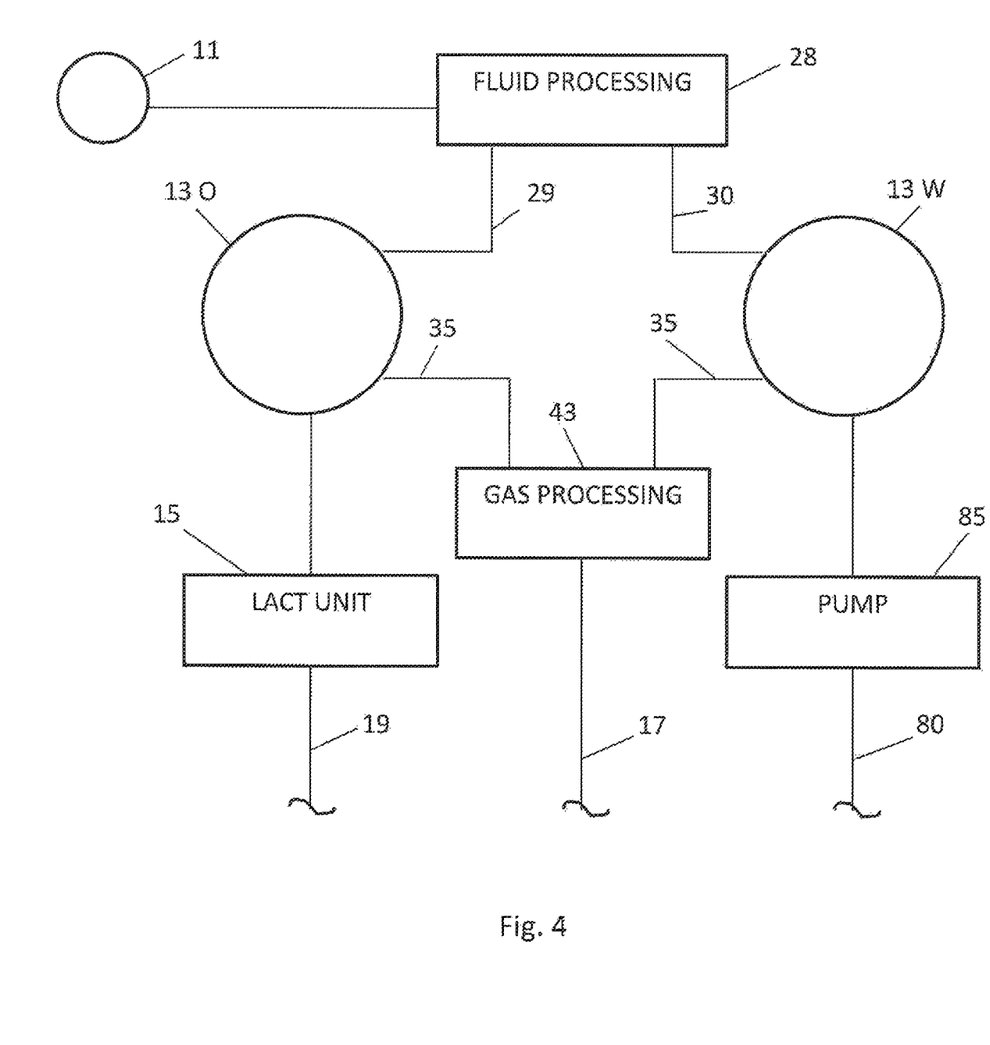
FIG. 4 is a diagram showing various surface components of a producing oil well, including oil and water storage tanks.

FIG. 4 illustrates another well site. The well 11 produces water in addition to oil and condensates. Some wells produce in the range of 70% water, 30% oil, so water production may be common.

The well fluids flow into processing equipment 28, which includes one or more separators. Oil and condensates flow into the oil storage tank 13 O, discussed above in FIG. 1 (referenced as 13). Although not shown in FIG. 4, the oil storage tank is provided with the control system shown in FIG. 1. Water follows by line 30 into water storage tank 13 W. Gas flashes off of the water inside the tank 13 W. Each storage tank has a respective gas outlet line 35 that brings gas to the gas processing equipment 43 (such as a vapor recovery unit), which in turns provides gas to the gas sales line 17. Thus, the gas from the water storage tank flows to downstream equipment. It is common to combine the gas from the water storage tank 13 W with the gas from the oil storage tank 13 O for processing and sale. FIG. 4 illustrates one example where the gas is combined at the well site in or before (upstream the gas processing equipment 43.

The water storage tank 13 W is provided with a pump 85 that removes water from the tank via line 82 and pumps it into a line 80. The line 80 can run to a pipeline, a truck, etc. The water is disposed of, such as down a disposal well.

Figure 5:
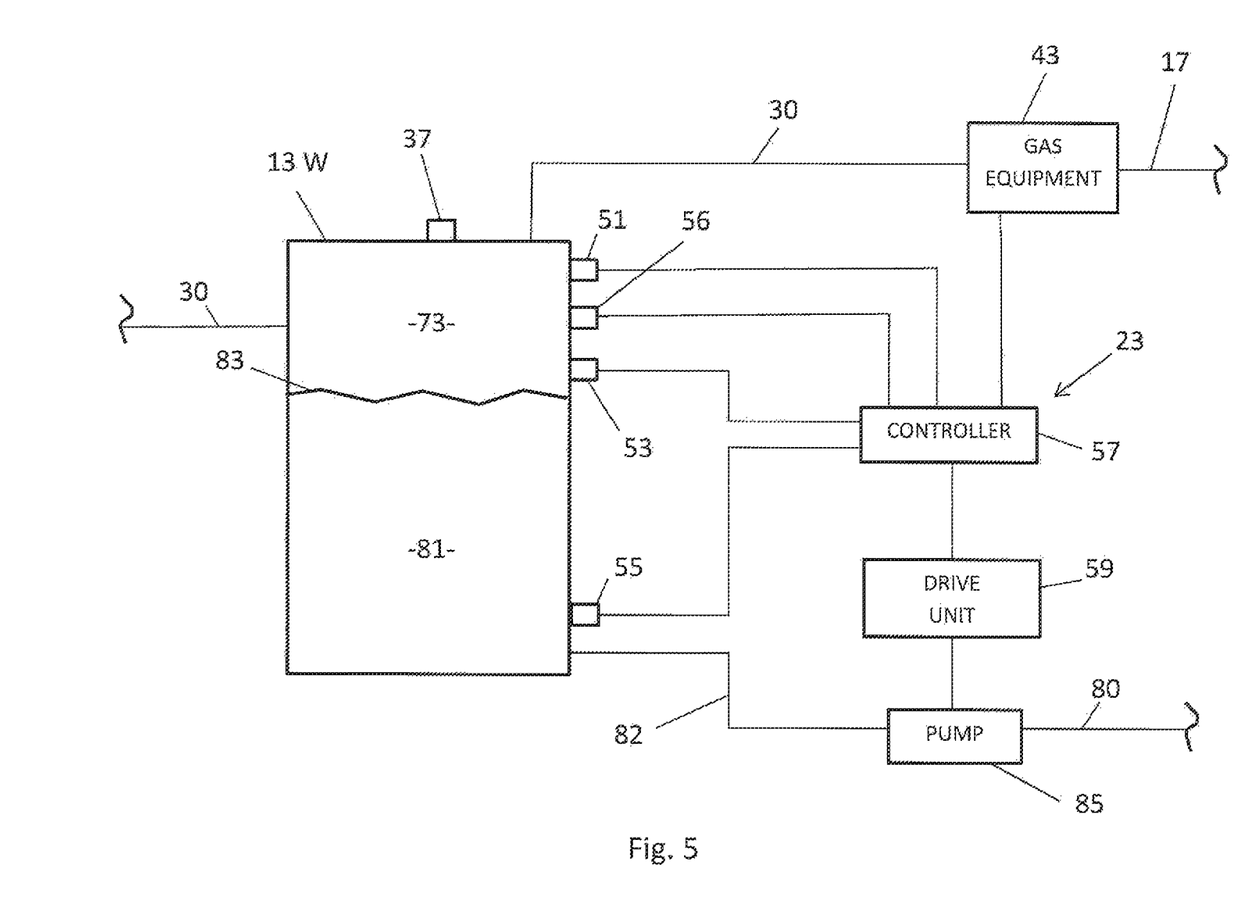
FIG. 5 is a diagram showing the water tank of FIG. 4, equipped with a controller system.

FIG. 5 shows the water storage tank 13 W equipped with the control system 23. The water storage tank contains water 81 having a top level 83. Above the water is the as cap 73. Gas flashes off of the water 81 up into the gas cap. The water storage tank has a pressure sensor 51 located so as to measure gas cap pressure, a high liquid level sensor 53, a low liquid level sensor 55 and an emergency high level sensor 56. The sensors 51, 53, 55, 56 are connected as inputs to the controller 57. The controller 57 has an output that connects to the drive unit 59. The drive unit 59 operates the pump 85 at variable speeds. In the preferred embodiment, the drive unit 59 is a variable speed drive.

The controller 57 in FIG. 5 operates in the same manner as the controller 57 in FIGS. 1-3, discussed above. The pump 85 slows down if the pressure of the gas cap 73 falls below a threshold. This minimizes the possibility of atmospheric air entering the tank 13 W through valve 37 and mingling with the gas. Thus, the gas processing equipment 43 and other downstream equipment is protected from oxygen intrusion.

The well site is thus provided with a control system for the storage tanks, which tanks have pump off or pump removal units. The control system 23 includes controllers 57 and sensors 51, 53, 55, 56, as well as drives 59 for operating the pumps 39, 85 at variable speeds. The respective controllers operate independently of each other. The controller for the water storage tank 13 W operates independently of the controller for the oil storage tank 13 O.

The controllers 57 can be individual to each pump, as shown. Alternatively, a single controller can be used for all the pumps.

The foregoing disclosure and showings made in the drawings are merely illustrative of the principles of this invention and are not to be interpreted in a limiting sense.

The invention claimed is:

1. A well fluid storage system, comprising:
 a) a storage tank capable of holding well fluids, the storage tank having a gas cap located above a liquid, the storage tank having a fluid inlet, a liquid outlet and a gas outlet, the storage tank having a gas pressure relief valve that opens when gas pressure inside the storage tank decreases below a vacuum threshold pressure;
 b) a pump connected to the liquid outlet;
 c) a controller system comprising:
  i) a drive coupled to and operating the pump at a variable speed;
  ii) a gas pressure sensor in communication with the gas cap in the storage tank;
  iii) a controller connected to the gas pressure sensor and the drive, the controller operating the drive to slow the pump speed as the pressure in the gas cap decreases toward the vacuum threshold pressure so as to maintain the gas pressure relief valve in a closed condition.

2. The well fluid storage system of claim 1 wherein the storage tank comprises a water storage tank.

3. The well fluid storage system of claim 1 wherein the gas outlet of the storage tank is coupled to a valve and to gas processing equipment, the controller operating the valve to allow gas to flow from the storage tank to the gas processing equipment.

4. The well fluid storage system of claim 1 wherein the gas outlet of the storage tank is coupled to a valve and to a combustor, the controller operating the valve to allow gas to flow from the storage tank to the combustor.

5. The well fluid storage system of claim 4 wherein the liquid levels comprise an emergency high liquid level, wherein the controller operates the pump independently of the gas cap pressure when the liquid level is at the emergency high liquid level, the controller operating the valve to allow gas to flow from the storage tank to the gas combustor after the pump operates to reduce the emergency high liquid level.

6. The well fluid storage system of claim 1 further comprising at least one liquid level sensor in communication with an interior of the storage tank, and connected to the controller, the controller starting and stopping the pump according to liquid levels in the storage tank.

7. The well fluid storage system of claim 6 wherein the liquid levels comprise a high liquid level, wherein the controller starts the pump, and a low liquid level, wherein the controller stops the pump.

8. The well fluid storage system of claim 7 wherein the liquid levels further comprise an emergency high liquid level, wherein the controller operates the pump independently of the gas cap pressure.

9. The well fluid storage system of claim 1 wherein the storage tank comprises an oil storage tank, the well fluid storage system further comprising a lease automatic custody transfer unit, the pump being part of the lease automatic custody transfer unit.

10. The well fluid storage system of claim 9 wherein the lease automatic custody transfer unit comprises a meter coupled to an output of the pump, further comprising a flow meter that monitors the flow of oil into the meter, the controller stopping the pump if the flow of oil into the meter is less than a predetermined minimum flow.

11. A method of removing well fluids from a storage tank, the well fluids comprising gas and liquid, the gas located in a gas cap in the storage tank, the storage tank having a gas relief valve that opens to admit atmospheric air into the storage tank when the pressure of the gas cap decreases below a vacuum threshold pressure, comprising the steps of:
 a) allowing well fluids to flow into the storage tank;
 b) monitoring a level of liquid in the storage tank;
 c) operating a pump at a speed to remove liquid from the storage tank when the liquid level reaches a first level;
 d) monitoring pressure of the gas cap while the pump is operating;
 e) adjusting the speed of the pump to maintain the gas cap pressure above the predetermined pressure and avoid the introduction of atmospheric air into the gas cap.

12. The method of removing well fluids from a storage tank of claim 11 wherein the step of adjusting the speed of the pump further comprises the step of decreasing the speed of the pump if the gas cap pressure decreases below a predetermined pressure range.

13. The method of removing well fluids from a storage tank of claim 11 wherein the step of adjusting the speed of the pump further comprises the step of decreasing the speed of the pump if the gas cap pressure decreases at or above a predetermined rate of pressure change.

14. The method of removing well fluids from a storage tank of claim 11 wherein the step of adjusting the speed of the pump further comprises the step of decreasing the speed of the pump if the gas cap pressure decreases for a predetermined period of time.

15. The method of removing well fluids from a storage tank of claim 11 further comprising the step of stopping the pump when the liquid level reaches a second level which is below the first level.

16. The method of removing well fluids from a storage tank of claim 11 further comprising the step of operating the pump independently of the gas cap pressure when the liquid level reaches an emergency high liquid level.

17. The method of removing well fluids from a storage tank of claim 11 further comprising the step of delivering gas from the storage tank to a pipeline by opening a valve and allowing gas to flow from the storage tank to gas processing equipment.

18. The method of removing well fluids from a storage tank of claim 11 farther comprising the step of delivering gas from the storage tank to a combustor by opening a valve and allowing gas to flow from the storage tank to the combustor.

19. The method of removing well fluids from a storage tank of claim 11 wherein the step of operating a pump at a speed to remove liquid from the storage tank, further comprises the step of removing oil from the storage tank.

20. The method of removing well fluids from a storage tank of claim 11 wherein the step of operating a pump at a speed to remove liquid from the storage tank, further comprises the step of removing water from the storage tank.

* * * * *